United States Patent [19]

Schepers

[11] 4,341,884

[45] Jul. 27, 1982

[54] POLYMER COMPOSITION

[75] Inventor: Herman A. J. Schepers, Stein, Netherlands

[73] Assignee: Stamicarbon, B.V., Geleen, Netherlands

[21] Appl. No.: 249,878

[22] Filed: Apr. 1, 1981

[30] Foreign Application Priority Data

Apr. 4, 1980 [NL] Netherlands .......................... 8002023
Jul. 30, 1980 [NL] Netherlands .......................... 8004377

[51] Int. Cl.$^3$ ............................................. C08L 45/00
[52] U.S. Cl. .......................... 525/211; 260/DIG. 20; 525/192; 525/232; 525/238; 525/240
[58] Field of Search ............... 525/192, 210, 211, 238, 525/232; 260/45.8 NT, 45.8 SN, 45.85 B, 37 N, 32.6 N, DIG. 20, 240

[56] References Cited

U.S. PATENT DOCUMENTS 3,819,763 6/1974 Akane et al. .......................... 525/238

Primary Examiner—J. Ziegler

[57] ABSTRACT

An improved polymer composition having a combination of good flow behavior, UV stability, and very good impact resistance is described, essentially composed of a. 50–95 parts by weight of one or more copolymers obtained by the polymerization of a mixture of 10–90% by weight of acrylonitrile and/or methacrylonitrile; and, b. 5–50 parts by weight of
  1. a largely saturated rubber, and
  2. chlorinated polyethylene, wherein the chlorinated polyethylene has a chlorine content of 32–40% by weight, a DSC crystallinity of 0–7%, while the weight ratio of rubber to chlorinated polyethylene is between 2:1 and 1:10, i.e., from 0.1 to 2.

4 Claims, No Drawings

POLYMER COMPOSITION

This invention relates to an impact resistant polymer composition composed of a copolymer of an unsaturated nitrile, a largely saturated rubber and a chlorinated polyethylene.

Generally, an impact resistant polymer composition based on an unsaturated nitrile contains a graft polymer consisting of a rubber having grafted onto it one or more aliphatically unsaturated monomers, such as styrene, α-methylstyrene, acrylonitrile, vinylchloride, maleic anhydride and/or one or more acrylates. A typical example of such a polymer composition is ABS (graft copolymer of styrene and acrylonitrile on a (butadiene) rubber). As a result of such grafting on the rubber, of a part of the monomers forming the continuous phase (matrix) of the polymer composition, these compositions have a high impact resistance, particularly at low temperatures (−20° C.).

As the rubber, polybutadiene of a rubber related thereto is often used. These rubbers show a high degree of unsaturation in the main chain, and consequently they are sensitive to oxidation under influence of light and/or molecular oxygen. Owing to this, the physical and mechanical properties of objects made from such polymer compositions will strongly deteriorate to the point that they cannot be used, per se, for outdoor applications.

In order to overcome this problem, it has been suggested that the rubber be replaced in the polymer composition by a largely saturated rubber, such as an ethylene-propylene rubber or an ethylene-propylene diene rubber. For this purpose, see, for instance, the UK patent application No. 2005276 laid open to public inspection, or U.S. Pat. No. 3,886,233.

A polymer composition combining a good impact resistance with a good UV stability can thus be obtained.

A disadvantage, however, is that these graft copolymers exhibit a rather poor flow behavior, thus the processing speed is low and, particularly with complicated articles, problems may arise in respect of the filling of the mold. As compared with mixtures of polymers, these graft copolymers also require a rather complicated production process.

In a comparative example in the German Auslegeschrift No. 2235052, a polymer composition has been described consisting of 73 parts by weight of styrene-acrylonitrile copolymer, 27 parts by weight of a commercially available chlorinated polyethylene with a chlorine content of 30,3% and 5 parts by weight of ethylene-propylene-ethylidene-norbornene terpolymer. As appears from the text of that application, this polymer composition is lacking in impact resistance and tensile strength.

The purpose of the present invention is to provide an impact resistant polymer composition which does not show the disadvantages mentioned.

The polymer composition according to this invention is essentially characterized by the conditions that the polymer composition comprises:

a. 50–95 parts by weight of one or more copolymers obtained by the polymerization of a mixture of 10–90% by weight of styrene and/or derivatives of styrene, with 90–10% by weight of acrylonitrile and/or methacrylonitrile; and, b. 5–50 parts by weight of 1. a largely saturated rubber, and
2. chlorinated polyethylene, wherein the chlorinated polyethylene has a chlorine content of 32–40% by weight, a DSC crystallinity of 0–7%, while the weight ratio of rubber to chlorinated polyethylene is between 2:1 and 1:10, i.e., from 0.1 to 2.

Surprisingly, it has now been found that such a polymer composition, in which no graft copolymer is incorporated, but which does incorporate a specific chlorinated polyethylene, not only has good flow behavior together with UV stability, but also has a very good impact resistance (even at low temperature). The flow behavior of the polymer composition is, according to applicant's measurements, comparable to the flow behavior of styrene-acrylonitrile copolymers.

In particular, the high impact resistance is surprising, because virtually no impact resistance is shown by polymer compositions based on a copolymer of an unsaturated nitrile and chlorinated polyethylene, or based on such copolymer and a largely saturated rubber, or based on all three components but wherein the chlorinated polyethylene does not meet the above-stated requirements in respect of chlorine content, crystallinity and/or glass transition temperature.

A further advantage of the polymer composition provided by this invention is that the ratio between rubber, CPE and copolymer of an unsaturated nitrile can be varied within wide limits. This means that there is substantial freedom in the making of polymer compositions having a wide range of properties, such as stiffness, heat deflection temperature (Vicat, HDT), impact strength, burning characteristics, gloss, mold shrinkage, flow behavior and deformability, and the like, of the eventual mixtures, without having to interfere in the specific preparation of one of the components, as is the case with the known products based on a graft copolymer.

As rubberlike, largely saturated polymers, those rubbers are suitable which have, in the main chain, either none or very little unsaturation, that is, which have fewer than 2 and preferably fewer than 1.5 double bonds per 100 carbon atoms. In the side chains, on the other hand, the rubbers may have unsaturation, which can be used, for instance, for cross-linking.

As a largely saturated rubber, basically all rubbers showing little or no main chain unsaturation, as described, can be used. Examples of such rubbers are those rubbers based upon ethylene copolymers such as ethylene-propylene rubbers, EPT-rubbers, hydrogenated polybutadiene rubber, acrylate rubber, butylrubber and chloro-butylrubber.

Rubbers which are particularly suitable for use according to the method of this invention are ethylene-propylene copolymers (so-called EP rubbers), butyl rubber and ethylene-propylene copolymers together with which other polyunsaturated monomers have been copolymerized (the so-called EPT rubbers), or mixtures of two or more of these rubbers. Examples of these polyunsaturated monomers include hexadiene-1,4-dicyclopentadiene, tricyclopentadiene, 5-vinylnorbornene-2, 5-ethylidene-norbornene-2, 5-methylene norbornene-2, 5-(2-propenyl)-norbornene-2, 5-(5-hexenyl) norbornene-2, 4,7,8,9-tetrahydro-indene and isopropylidene tetrahydro-indene.

It is not essential for the polymer composition to be vulcanized; consequently, the use of polyunsaturated monomers is not necessary. For economic reasons, it may therefore be advantageous to use ethylene-propylene rubber in the polymer composition.

In certain cases it may also be advantageous to crosslink the rubber, either wholly or partly. This can be effected in the usual manner, for instance, by peroxides or by using chemically modified rubber.

The chlorinated polyethylene, or a mixture of two or more chlorinated polyethylenes, suitable for use in the polymer compositions according to this invention can themselves be made as is already known in the art, e.g., by chlorinating polyethylene in solution, suspension or gas phase. For this purpose see, for instance, the Dutch patent applications Nos. 7311780 and 7701599 laid open to public inspection. In this process, high density polyethylene is preferably used as starting material, that is a polyethylene with a density of between 935 and 965 kg/m$^3$, and which may have been made by means of a catalyst based on transition metals. The chlorinated polyethylenes should have a chlorine content of between 32 and 40% by weight.

In addition, the chlorinated polyethylene preferably has a crystallinity (measured with Differential Scanning Calorimeter (DSC)) which is between 0 and 7%.

The crystallinity is determined by first keeping a sample, in a "differential scanning calorimeter", at +150° C. for 5 minutes, subsequently cooling it off to +50° C. at a cooling rate of 5° C. per minute and heating it up again to +150° C. at a rate of 5° C. per minute. During this heating-up the melting heat is measured. The crystallinity is determined by means of the following formula:

$$\text{crystallinity (\%)} = \frac{\text{melting heat measured (J/g)}}{\text{theoretical melting heat of 100\% crystalline polyethylene (J/g)}} \times 100\%$$

With such chlorinated polyethylenes, the glass transition temperature will be less than −15° C.

Glass transition temperature is, in this context, understood to mean the temperature at which the loss modulus G″, measured with a torsion damping meter at a frequency of 0.2153 Hz and a heating-up rate of 1° C. per minute, pertains a maximum, in the vicinity of which the storage modulus, G′ shows a transition from a value characteristic for a glassy state to a value characteristic for a rubbery state.

In this connection it should be noted, however, that chlorinated polyethylene generally has two transition temperatures. One transition is generally in the neighborhood of −120° C. The other transition temperature is at a higher value and varies according to the manner in which the chlorinated polyethylene has been prepared. The latter transition temperature is generally referred to in the literature when the glass transition temperature of chlorinated polyethylene is spoken of. It is, therefore, this latter temperature which is referred to, in the present application, as the glass transition temperature of chlorinated polyethylene.

By the specific choice of the combination of chlorine content and DSC crystallinity, a chlorinated polyethylene is obtained which provides in the polymer composition combination, with copolymer and rubber, in certain ratios, a surprisingly high impact resistance combined with a good modulus of elasticity and a good flow behavior.

The preparation of the copolymer of an unsaturated nitrile can be effected continuously or batchwise, by known polymerization techniques, such as emulsion, suspension, solution and mass polymerization, or combinations thereof, which are all suitable.

As such copolymer, the various known copolymers based on acrylonitrile or derivatives thereof can be used.

Examples of applicable copolymers are those of styrene or halo- or alkyl-substituted styrenes with aliphatically unsaturated nitriles, particularly the acrylonitriles, such as styrene-acrylonitrile copolymer, α-methylstyrene-acrylonitrile copolymer, styrene- or α-methylstyrene-acrylonitrile terpolymer as well as copolymers of acrylonitrile with halogenated styrene, or mixtures of two or more of the polymers mentioned.

The weight ratio between the chlorinated polyethylene and the rubber is preferably between 1:2 and 10:1, i.e., 0.5 to 10. Within these limits a polymer composition is obtained which has a particularly good impact resistance, even at low temperature (−20° C.).

Optimum properties are achieved if the weight ratio of chlorinated polyethylene are largely saturated rubber is between 1:1 and 4:1.

The polymer composition according to the invention can be formed by methods already known in the art, from the various raw materials using techniques customary for this purpose. Depending on the form in which the raw materials are available (powder, crumb, liquid), various apparatus or combinations thereof can be used, such as an impeller mixer, Banbury mixer, mixing extruder, and the like.

Since impact resistant polymer compositions are generally supplied by the producers in granular form, the polymer composition will generally, after the mixture of the raw materials, be granulated by means of an extruder. In this extruder the mixing may itself be effected as well.

The polymer composition according to the invention preferably consists of a. 50–95% by weight of styrene-acrylonitrile copolymer, and b.1. 2.5–25% by weight of ethylene-propylene rubber or ethylene-propylenediene rubber, and b.2. 2.5–25% by weight of chlorinated polyethylene, to which has been added c. 0–10% by weight of additives.

The usual additives, such as antioxidants, antistatics, lubricants, fillers, colorants, pigments, UV stabilizers, fungicides, etc., can be added to the polymer composition.

The polymer composition provided by this invention is particularly suitable for the manufacture of objects for which high standards are required in respect of the mechanical and physical properties, such as impact resistance, stiffness, etc., particularly if these properties must be combined with UV resistance.

The polymer composition is accordingly suitable for many various applications. Thus, such impact resistant objects can be made from it as, for instance, pipes, bottles, furniture, dash boards for motor cars, cabinets, and housings for electronic and domestic equipment, shoe heels, caravans, skis and surf boards.

EXAMPLES I THROUGH V

Five polymer compositions were made from 75 parts by weight of styrene-acrylonitrile copolymer, 12.5 parts by weight of chlorinated polyethylene and 12.5 parts by weight of ethylene-propylene-ethylidene-norbornene rubber. The nitrogen content of the copolymer was 6.9% and the viscosity number was 0.64 dl/g (0.1 g in 100 ml acetone at +20° C.). The EPT rubber applied had an ethylene content of 74% by weight, an ethylidene-norbornene content of 1.85% by weight and a Hoekstra plasticity of 53.

Table 1 successively gives the number of the Example, the glass transition temperature ($T_g$), the crystallinity and the chlorine content of the chlorinated polyethylene, the impact resistance (Izod +23° C.) and the bending modulus.

TABLE 1

|   | $T_g$ °C. | Crystallinity (%) | Cl Content (% by wt) | Izod (kJ/m$^2$) | Bending Modulus N/mm$^2$ |
|---|---|---|---|---|---|
| I | 15 | 4 | 36 | 20 | 2280 |
| II | 22 | 0 | 36 | 14.1 | 2320 |
| III | 15.5 | 3 | 30 | 8.9 | 2350 |
| IV | 25 | 0 | 28.6 | 6.2 | 2330 |
| V | 15 | 0 | 43 | 8.5 | 2340 |

For the composition of Example I the Izod at −20° C. is 5 kJ/m$^2$ and the HDT 86° C.

The above Table clearly shows that polymer compositions with a crystallinity and a chlorine content within the limits of this invention (Examples I and II) have a very good impact resistance, in contrast to those falling outside such limits (see chlorine content of Examples III–V).

EXAMPLES VI THROUGH XI

On the basis of 75 parts by weight of SAN[1] and 25 parts by weight of CPE[2] and/or EPT[3] a number of compositions were made. The CPE and EPT compositions themselves correspond to those used in Example I.

Table 2 successively gives the quantities by weight of SAN, CPE and EPT, the impact resistance (Izod +23° C.), the bending modulus and the maximum bending strength.

TABLE 2

|   | SAN pts. by wt. | CPE pts. by wt. | EPT pts. by wt. | Izod (kJ/m$^2$) | Bending Modulus (N/mm$^2$) | Max. Bending Strength N/mm$^2$ |
|---|---|---|---|---|---|---|
| VI | 75 | 25 | — | 4.5 | 2330 | 81.0 |
| VII | 75 | 22.5 | 2.5 | 9.4 | 2350 | 78.6 |
| VIII | 75 | 20 | 5 | 27.3 | 2280 | 74.6 |
| IX | 75 | 17.5 | 7.5 | 26.7 | 2360 | 78.4 |
| I | 75 | 12.5 | 12.5 | 20 | 2280 | 76 |
| X | 75 | 7.5 | 17.5 | 9.1 | 2060 | 66.1 |
| XI | 75 | — | 25 | 2.3 | 1290 | 26.2 |

[1]SAN: Styrene-acrylonitrile copolymer
[2]CPE: Chlorinated polyethylene
[3]EPT: Ethylene-propylene-diene rubber This Table shows that if compositions are formulated with a given CPE but without the EPT (Example VI) or with too much EPT (Example X; ratio EPT:CPE is 2.33), or omitting the CPE entirely, one or more of the desirable characteristics are lost as compared to the other compositions made within the limits of this invention.

EXAMPLES XII THROUGH XVI

In the same manner as Table 2, Table 3 includes a number of polymer compositions, with this difference that the chlorinated polyethylene used in Example II above has again been used.

TABLE 3

|   | SAN Parts by wt. | CPE Parts by wt. | EPT Parts by wt. | Izod (kJ/m$^2$) | Bending Modulus (N/mm$^2$) |
|---|---|---|---|---|---|
| XII | 75 | 25 | — | 7.6 | 2460 |
| XIII | 75 | 22.5 | 2.5 | 10.4 | 2380 |
| XIV | 75 | 20 | 5 | 22.8 | 2340 |
| XV | 75 | 17.5 | 7.5 | 24.4 | 2230 |
| II | 75 | 12.5 | 12.5 | 14.1 | 2320 |
| XVI | 75 | 7.5 | 17.5 | 7.4 | 2080 |

This Table again shows that with a given CPE composition, formulations falling outside the limits of this invention (see Examples XII, no EPT, and XVI too much EPT) are inferior in one or more of the desirable physical characteristics.

What is claimed is:

1. An impact resistant polymer composition combination formulated from the combination of:
    a. 50 to 90 parts by weight of at least one copolymer obtained by the copolymerization of 10 to 90% by weight of a styrene monomer with 90 to 10% by weight of acrylonitrile or methacrylonitrile monomer;
    b. 5 to 50 parts by weight of
        b.1. a rubber having a substantially-saturated main chain, and
        b.2. a chlorinated polyethylene having a chlorine content of between 32 and 40% by weight and a DSC crystallinity of 0 to 7%,
while maintaining the weight ratio of said chlorinated polyethylene to said rubber is between 1:1 and 4:1.

2. A polymer composition according to claim 1, wherein said copolymer is a copolymer of styrene or α-methylstyrene with acrylonitrile.

3. A polymer composition according to claim 1, wherein said rubber is an ethylene-propylene rubber or an ethylene-propylene-diene rubber.

4. A polymer composition according to claim 1, which has the composition of
    a. 50 to 90% by weight of styrene-acrylonitrile copolymer or α-methylstyrene acrylonitrile copolymer,
    b.1. 2.5 to 25% by weight of ethylene-propylene rubber or ethylene-propylene-diene rubber, and
    b.2. 2.5 to 25% by weight of chlorinated polyethylene, to which has been added
    c. up to 10% by weight of additives.

* * * * *